July 3, 1962  KUNIKA USHIO  3,041,927
ABNORMAL COLOR SENSE CORRECTING APPARATUS
Filed April 21, 1958
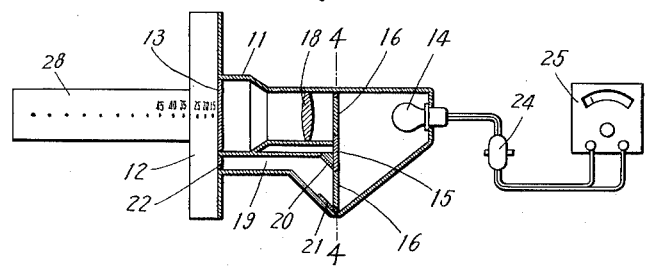
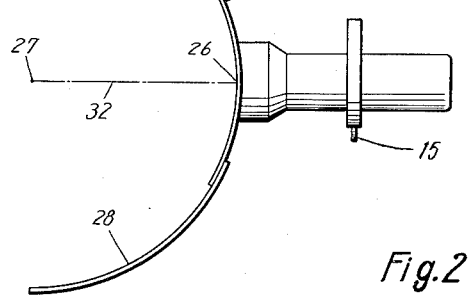
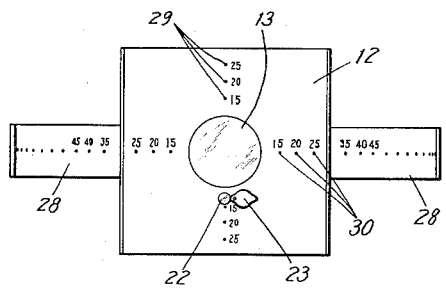
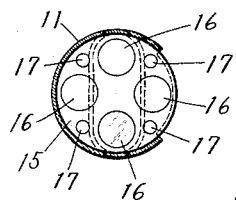
Kunika USHIO
INVENTOR
By: Wenderoth, Lind & Ponack
Attys

United States Patent Office 3,041,927
Patented July 3, 1962

3,041,927
ABNORMAL COLOR SENSE CORRECTING APPARATUS
Kunika Ushio, 879 Kaneko-ko, Niihama, Ehime, Japan
Filed Apr. 21, 1958, Ser. No. 729,653
3 Claims. (Cl. 88—20)

This invention relates to an abnormal color sense correcting apparatus.

Heretofore, various investigations have been made into the actual conditions of abnormal color sense, particularly weak color sense but with no great success.

I have discovered the fact that in a person with normal color sense each of twelve pure colors causes an after image phenomenon in which, for instance, after gazing at something red about twenty seconds, after which the red is removed, there appears the after image of blue-green, the complementary color of the red, while in a person with abnormal color sense at least one of four negative after images is not formed or is indistinctly formed. Making use of this knowledge, various experiments have been made to get actual improvement of color sense, which experiments have resulted in an abnormal color sense correcting apparatus in which some prescribed colored lights can be easily and properly projected upon the retina for stimulating abnormal color sense, primarily weak color sense, so that it responds to the after image.

The present invention is illustrated, in its preferred embodiments, by the accompanying drawings, in which:

FIG. 1 is a plan view of an abnormal color sense correcting apparatus embodying the present invention.

FIG. 2 is an elevation of the same.

FIG. 3 is a sectional plan view of FIG. 1 and

FIG. 4 is a sectional elevation on line 4—4 of FIG. 3.

The front part of a projector casing 11 is provided with an after image viewing plate 12 having a translucent screen 13 at its center, and behind the screen 12 is provided an electric lamp 14 for a light source. Between the translucent screen 13 and the electric lamp 14 is pivotably mounted a rotatable plate 15 in which are fixed four filters 16, i.e., a blue-green, a red, a yellow and a blue-purple one and between them four auxiliary filters 17, e.g., a yellow-orange, a blue, a green and a red-purple one. The filters 16 and 17 in each set are arranged in diametrically opposed pairs with the color of one filter in each pair being complementary to the color of the other filter in the pair. Thus the filters 16 will be arranged in two diametrically opposed pairs, one pair having a blue-green and a red filter, and the other pair having a yellow and a blue-purple filter. In front of the rotatable plate 15 is fixed a focusing lens 18, beneath which is made a complementary color projecting passageway 19 with reflecting plates 20, 21, and thus the complementary color of the projection upon the translucent screen 13 appears on a complementary color translucent screen 22 which is positioned in the viewing plate 12. The complementary color translucent screen 22 has a cover 23 capable of covering and uncovering the surface. The circuit of the electric lamp 14 is provided with a switch 24 and a transformer 25 to regulate illuminating power. The translucent screen 13 is marked with a gazing point 26 at its center. The after image viewing plate 12 is curved to form a concave surface of which the center is at a viewing point 27. On the vertical and horizontal center lines through gazing point 26 the after image viewing plate 12 are indications 29 and 30 to indicate angles of elevation and depression and lateral angles to the datum line 32 between the viewing point 27 and the gazing point 26.

In this apparatus, when the rotatable plate 15 rotating the filter 16 of a desired color is placed at its top, i.e., at the illuminating position, the electric lamp 14 is lighted and the light of the said desired color passing through the said filter is projected on the translucent screen 13, while the light of complementary color is projected on the complementary color translucent screen 22 through the complementary color filter, the reflecting plates 20, 21 and the complementary color projecting passageway 19. Thus, when the red, for example, is projected on the translucent screen 13, the blue-green, i.e. its complementary color, is projected on the complementary color translucent screen 22. The cover 23 may be opened as the occasion demands and there can be seen the complementary color of the color projected on the translucent screen 13.

During the first period of abnormal color sense correction by the use of the apparatus according to the invention, the viewing point 27 is placed 40 centimeters from the translucent screen 13 in a room having a light intensity of from 40 to 60 luxes. The subject looks at the points which are 30°, 20°, and 10° to the right of the translucent screen successively, than at the points which are 30°, 20° and 10° to the left, above, and below the translucent screen respectively, and the electric lamp 14 is lighted for a period of 20 seconds three times for each point. The complementary color translucent screen 22 is left uncovered, and the subject looks at the plate 12 after the expiration of each 20 second period and compares the after image with the color appearing in the complementary color translucent screen 22. This enables the operator to determine the angles at which the after image nearest to the color on the complementary color translucent screen appears, and consequently permits a decision as to the appropriate angle for projection of each color. In order to obtain the desired displacement, the subject's head may be turned, or the apparatus may be displaced on an arc about the viewing point 27. During the first period of correction, this procedure is followed for a period of from one to two hours each day.

During the second period of color sense correction, each color on the plate 15 is projected twice at each point 29 and 30 for a period of 2 seconds. With the cover 23 over the translucent screen 22, the plate 15 is rotated so that a filter of a complementary color is positioned between the lamp 14 and the translucent screen 13, and the complementary color is projected for a period of 5 seconds, and then the lamp is switched off. The appearance of an after image of the proper color, and its duration may be recorded.

By repeating the above stated process, normal color sense gradually revives as the duration of the after images becomes longer and their colors deeper.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. An abnormal color sense in proving apparatus comprising a viewing plate having a translucent screen therein, a complementary color translucent screen adjacent to said translucent screen, a cover pivotally mounted over said complementary color translucent screen, a projector on which said translucent screens are mounted, a light source in said projector directed toward said translucent screen, a light conducting passageway in said projector from said light source to said complementary color translucent screen, and a plate having at least two pluralities of colored filters, the filters in each plurality being in diametrically opposed pairs with the color of one filter in each pair being complementary to the color of the other filter in the pair, said plate being rotatably mounted in said projector for positioning one of the filters in a pair between the light source and said translucent screen and the other filter in the pair between said light source and said passageway, the filter between the light source and the passageway being complementary in color to the filter between the light source and the translucent screen.

2. An abnormal color sense in proving apparatus comprising a curved viewing plate having a translucent screen centrally therein, a translucent complementary color screen in said viewing plate adjacent to said translucent screen, a cover on said viewing plate and pivotable over said complementary color translucent screen, a projector casing on which said viewing plate is mounted, a light source in said casing directed toward said translucent screen, a light conducting passageway in said casing from said light source to said complementary color translucent screen, and a filter holding plate having at least two pluralities of colored filters therein, the filters in each plurality being in diametrically opposed pairs with the color of one filter in each pair being complementary to the color of the other filter in the pair, said plate being rotatably mounted in said casing for positioning one of the filters in a pair of filters between said light source and said translucent screen and the other filter in the pair between said light source and said passageway, the filter between the light source and the passageway being complementary in color to the filter between the light source and the translucent screen.

3. An apparatus as claimed in claim 2 in which said light source comprises an electric lamp and a transformer connected between said lamp and a source of power, whereby the intensity of said lamp can be varied.

References Cited in the file of this patent

UNITED STATES PATENTS

| | | |
|---|---|---|
| 1,973,966 | Tillyer | Sept. 18, 1934 |
| 2,328,700 | Wiltberger | Sept. 7, 1943 |
| 2,425,821 | Newton | Aug. 19, 1947 |
| 2,803,990 | MacKnight | Aug. 27, 1957 |

FOREIGN PATENTS

| | | |
|---|---|---|
| 449,047 | Great Britain | June 19, 1936 |

OTHER REFERENCES

The Optical Journal and Review of Optometry, Lepper article, vol. LXXIX, No. 20, October 15, 1942, page 24.